(12) United States Patent
Lu

(10) Patent No.: US 10,108,051 B1
(45) Date of Patent: Oct. 23, 2018

(54) METHOD FOR SEALING PERIPHERAL FRAME OF DISPLAY

(71) Applicant: Shenzhen China Star Optoelectronics Technology Co., Ltd., Shenzhen (CN)

(72) Inventor: Xiang Lu, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/539,693

(22) PCT Filed: May 19, 2017

(86) PCT No.: PCT/CN2017/085199
§ 371 (c)(1),
(2) Date: Jun. 26, 2017

(30) Foreign Application Priority Data

Mar. 30, 2017 (CN) .......................... 2017 1 0203483

(51) Int. Cl.
*G02F 1/1339* (2006.01)
*G02F 1/13* (2006.01)

(52) U.S. Cl.
CPC .... *G02F 1/1339* (2013.01); *G02F 2001/1316* (2013.01)

(58) Field of Classification Search
CPC .................................................... G02F 1/1339
USPC ..................................................... 445/23–25
See application file for complete search history.

(56) References Cited

U.S. PATENT DOCUMENTS

2001/0055087 A1  12/2001  Gutfeld et al.

FOREIGN PATENT DOCUMENTS

| CN | 102636917 A | 8/2012 |
| CN | 103064209 A | 4/2013 |
| CN | 103197472 A | 7/2013 |
| CN | 103412443 A | 11/2013 |
| CN | 104362243 A | 2/2015 |
| CN | 104793408 A | 7/2015 |

*Primary Examiner* — Joseph L Williams
(74) *Attorney, Agent, or Firm* — Leong C. Lei

(57) ABSTRACT

The present invention provides a method for sealing a peripheral frame of a display screen. The method for sealing a peripheral frame of a display screen includes providing a display screen that comprises a first substrate and a second substrate and the first substrate comprises a panel zone covered by the second substrate and a peripheral frame located outside the panel zone and making the display screen suction-attached to a substrate suction-holding platform to have one side of the second substrate that is distant from the first substrate attached to a separation and protection film provided on the substrate suction-holding platform with an edge of the first substrate set at predetermined spacing from a positioning plate provided on the substrate suction-holding platform so that a sealant injection device is operable to inject sealant along and into a gap between the edge of the first substrate and the positioning plate to achieve coating uniformity of sealant on the peripheral frame and precise control of thickness of sealant, and only a low level of accuracy of the sealant injection device is required to thereby greatly reduce manufacturing costs.

18 Claims, 5 Drawing Sheets

METHOD FOR SEALING PERIPHERAL FRAME OF DISPLAY

BACKGROUND OF THE INVENTION

1. Field of the Invention

The present invention relates to the field of manufacture of display devices, and more particular to a method for sealing a peripheral frame of a display.

2. The Related Arts

With the development of the display technology, flat panel display devices, such as liquid crystal displays (LCDs), which show various advantages, such as high image quality, low power consumption, thin device body, and wide range of applications, have been widely used in various consumer electronic products, such as mobile phones, televisions, personal digital assistants (PDAs), digital cameras, notebook computers, and desktop computers and are becoming a main stream of display devices.

Most of the LCDs that are currently available in the market are backlighting LCDs, which comprise a liquid crystal display panel and a backlight module. The working principle of the liquid crystal display panel is that with liquid crystal molecules disposed between two parallel glass substrates and multiple vertical and horizontal tiny conductive wires arranged between the two glass substrates, electricity is applied to control the liquid crystal molecules to change direction for refracting out light emitting from the backlight module to generate an image. The liquid crystal display panel is generally made up of a color filter (CF) substrate, a thin-film transistor (TFT) substrate, liquid crystal (LC) interposed between the CF substrate and the TFT substrate, and sealant.

Jointed display screens are widely used today in various applications including outdoor media, exhibition halls, public squares, playhouses, and surveillance facility for observation by the public. A conventional large-area jointed display screen is generally made up of multiple small-area display screens jointed together. An image division device is applied to divide an image to be displayed into fractional segments, which are then respectively transmitted to the small-area display screens to be displayed thereon. The display screens that are available from the contemporary technology inevitably have a peripheral frame, broad or narrow, and thus, the large-area display screen formed through jointing commonly has a jointing frame. Since the jointing frame is generally not a display zone and thus, the frame must be handled for light shielding in order to prevent light leakage at the frame site and to thus improve image quality and enhance viewers' pleasure.

A commonly used measure for sealing a peripheral frame of a display screen is front side application. As shown in FIG. 1, a sealant injection device 300 is provided on one side of a peripheral frame 101 of a TFT substrate 100 that is close to a CF substrate 200. The sealant injection device 200 directly applies sealant to the peripheral frame 101 to provide sealant 400 on the peripheral frame 101. This measure of front side application of sealant suffers poor controllability of coating thickness and coating uniformity, and also requires high levels of accuracy for the sealant injection device 300, making the operation cost relatively high. Another known measure for sealing a peripheral frame of a display screen is attaching a piece of light-shielding adhesive tape. As shown in FIG. 2, a light-shielding adhesive tape 500 is directly attached to the peripheral frame 101. However, this measure of attaching light-shielding adhesive tape suffers the light-shielding adhesive tape 500 not matching the peripheral frame 101 in respect of size and thickness, and having poor adhesion that readily leads to detachment of the light-shielding adhesive tape 500 and consequently light leakage.

SUMMARY OF THE INVENTION

An objective of the present invention are to provide a method for sealing a peripheral frame of a display screen, which sufficiently ensures coating uniformity of sealant and provides accurate control of sealant thickness, and requires only low level of accuracy for a sealant injection device so as to greatly reduce manufacturing costs.

To achieve the above objective, the present invention provides a method for sealing a peripheral frame of a display screen, which comprises the following steps:

Step S1: providing a display screen, wherein the display screen comprises: a first substrate and a second substrate arranged on the first substrate, and the first substrate comprises a panel zone covered by the second substrate and a peripheral frame located outside the panel zone;

Step S2: providing a substrate suction-holding platform, wherein the substrate suction-holding platform has an upper surface on which a positioning plate is provided; and a separation and protection film is attached to the upper surface of the substrate suction-holding platform;

Step S3: suction-attaching the display screen to the substrate suction-holding platform such that one side of the second substrate that is distant from the first substrate is attached to the separation and protection film and an edge of the first substrate is spaced from the positioning plate by a predetermined gap;

Step S4: using a sealant injection device to inject sealant along and into the gap between the edge of the first substrate and the positioning plate;

Step S5: subjecting the sealant to curing;

Step S6: terminating suction-attachment of the display screen to the substrate suction-holding platform and removing the display screen from the substrate suction-holding platform to remove the separation and protection film from the surface of the second substrate; and Step S7: cutting the sealant in a straight linear manner alongside the edge of the first substrate.

Step S1 further comprises a sub-step of cleaning a surface of the peripheral frame.

The positioning plate is arranged on an edge of the upper surface of the substrate suction-holding platform.

The first substrate comprises a thin-film transistor (TFT) substrate and the second substrate comprises a color filter substrate.

In Step S2, the separation and protection film is attached such that no gap is present between the separation and protection film and the positioning plate.

The predetermined gap is between 0.5 mm-10 mm.

The sealant has a color of black or brown.

T the sealant comprises a heat curable sealant, and curing of the sealant is conducted through heating in Step S5.

The sealant comprises a light curable sealant, and curing of the sealant in conducted through irradiating light in Step S5.

Step S4 further comprises a sub-step of keeping the display screen still for a predetermined period of time after the injection of the sealant.

The present invention also provides a method for sealing a peripheral frame of a display screen, which comprises the following steps:

Step S1: providing a display screen, wherein the display screen comprises: a first substrate and a second substrate arranged on the first substrate, and the first substrate comprises a panel zone covered by the second substrate and a peripheral frame located outside the panel zone;

Step S2: providing a substrate suction-holding platform, wherein the substrate suction-holding platform has an upper surface on which a positioning plate is provided; and a separation and protection film is attached to the upper surface of the substrate suction-holding platform;

Step S3: suction-attaching the display screen to the substrate suction-holding platform such that one side of the second substrate that is distant from the first substrate is attached to the separation and protection film and an edge of the first substrate is spaced from the positioning plate by a predetermined gap;

Step S4: using a sealant injection device to inject sealant along and into the gap between the edge of the first substrate and the positioning plate;

Step S5: subjecting the sealant to curing;

Step S6: terminating suction-attachment of the display screen to the substrate suction-holding platform and removing the display screen from the substrate suction-holding platform to remove the separation and protection film from the surface of the second substrate; and Step S7: cutting the sealant in a straight linear manner alongside the edge of the first substrate;

wherein Step S1 further comprises a sub-step of cleaning a surface of the peripheral frame; and wherein the positioning plate is arranged on an edge of the upper surface of the substrate suction-holding platform.

The efficacy of the present invention is that the present invention provides a method for sealing a peripheral frame of a display screen, which comprises providing a display screen that comprises a first substrate and a second substrate and the first substrate comprises a panel zone covered by the second substrate and a peripheral frame located outside the panel zone and making the display screen suction-attached to a substrate suction-holding platform to have one side of the second substrate that is distant from the first substrate attached to a separation and protection film provided on the substrate suction-holding platform with an edge of the first substrate set at predetermined spacing from a positioning plate provided on the substrate suction-holding platform so that a sealant injection device is operable to inject sealant along and into a gap between the edge of the first substrate and the positioning plate to achieve coating uniformity of sealant on the peripheral frame and precise control of thickness of sealant, and only a low level of accuracy of the sealant injection device is required to thereby greatly reduce manufacturing costs.

BRIEF DESCRIPTION OF THE DRAWINGS

For better understanding of the features and technical contents of the present invention, reference will be made to the following detailed description of the present invention and the attached drawings. However, the drawings are provided only for reference and illustration and are not intended to limit the present invention.

In the drawings.

DETAILED DESCRIPTION OF THE PREFERRED EMBODIMENTS

To further expound the technical solution adopted in the present invention and the advantages thereof, a detailed description will be given with reference to the preferred embodiments of the present invention and the drawings thereof.

Figure 1:
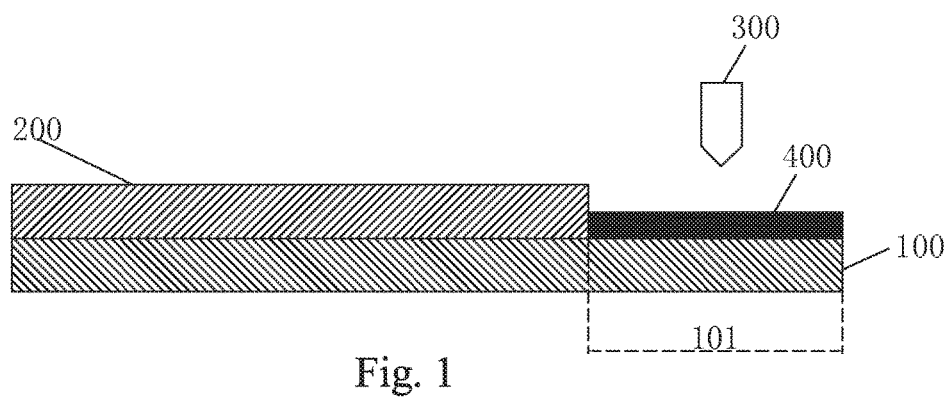
FIG. 1 is a schematic view illustrating a conventional way of sealing a peripheral frame of a display screen.
Figure 2:
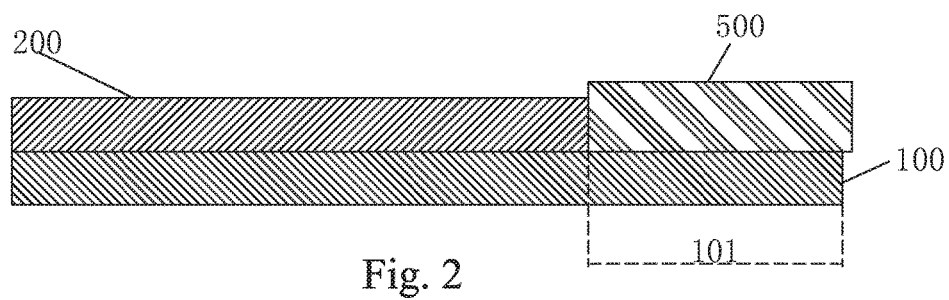
FIG. 2 is a schematic view illustrating another conventional way of sealing a peripheral frame of a display screen.
Figure 3:
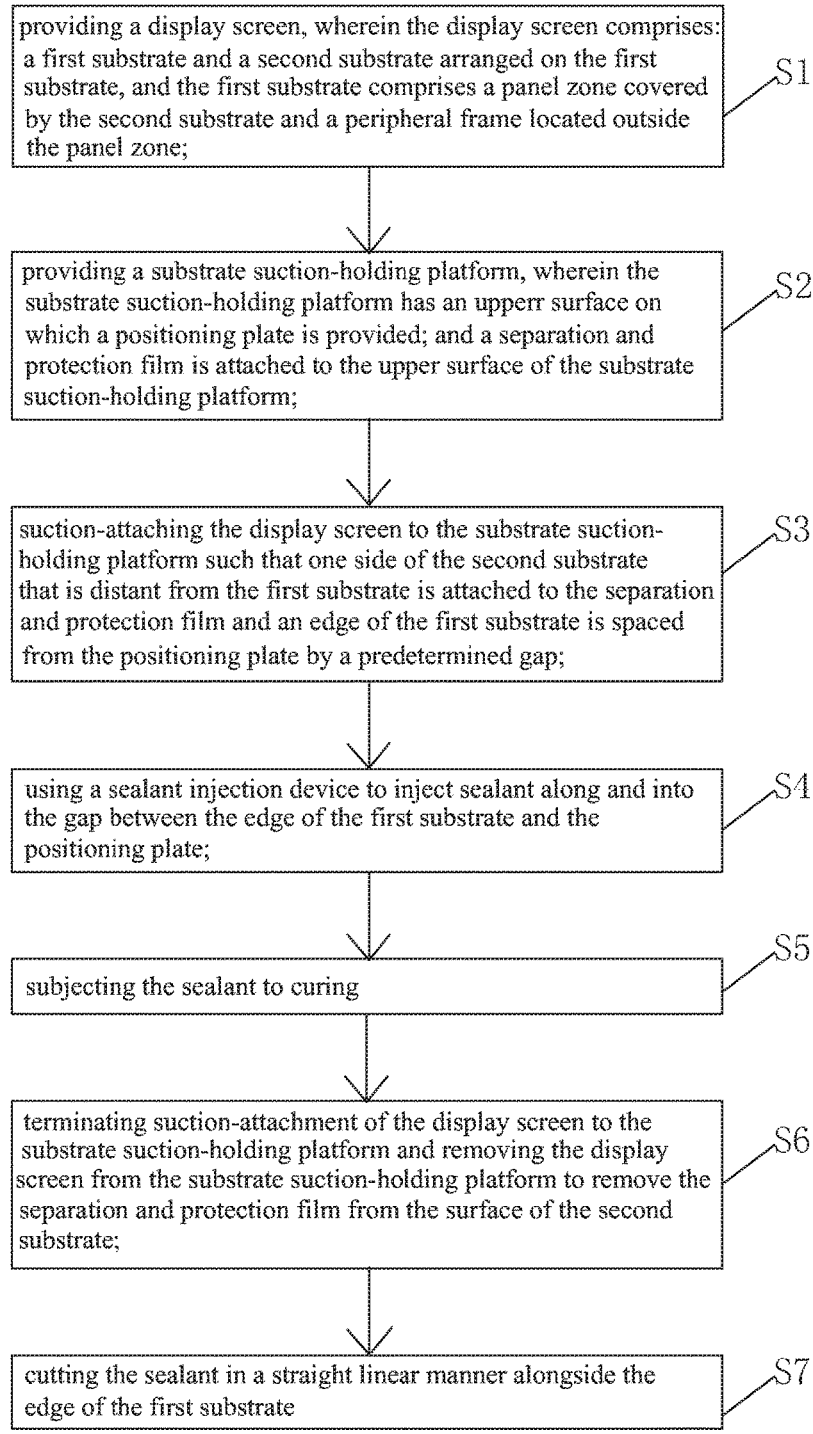
FIG. 3 is a flow chart illustrating a method for sealing a peripheral frame of a display screen according to the present invention.
Figure 4:
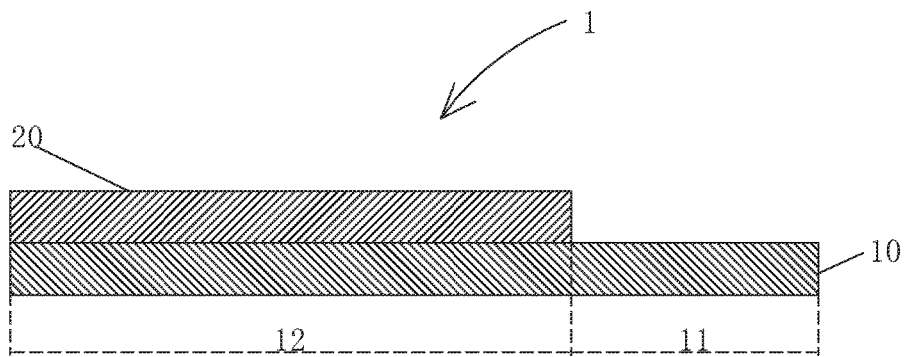
FIG. 4 is a schematic view illustrating Step S1 of the method for sealing a peripheral frame of a display screen according to the present invention.
Figure 5:
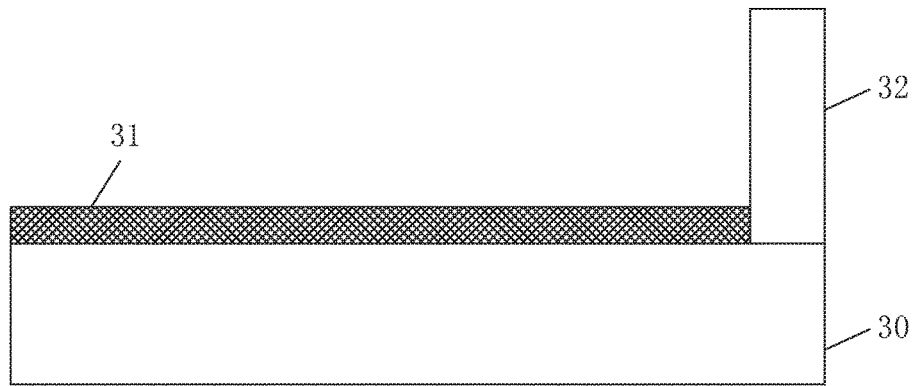
FIG. 5 is a schematic view illustrating Step S2 of the method for sealing a peripheral frame of a display screen according to the present invention.
Figure 6:
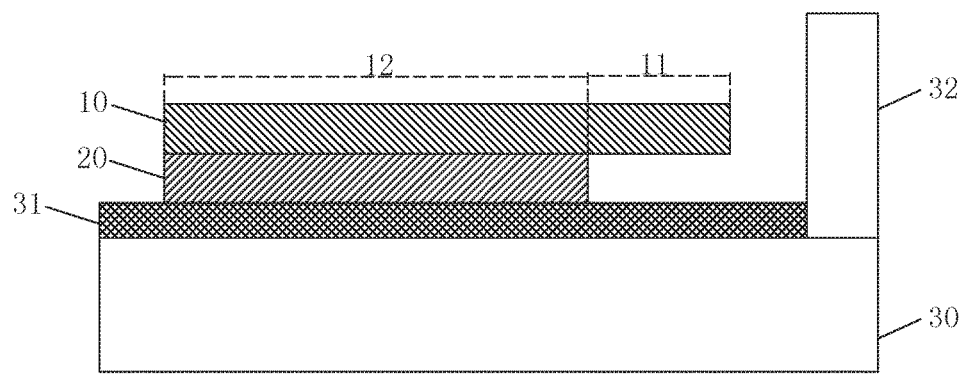
FIG. 6 is a schematic view illustrating Step S3 of the method for sealing a peripheral frame of a display screen according to the present invention.
Figure 7:
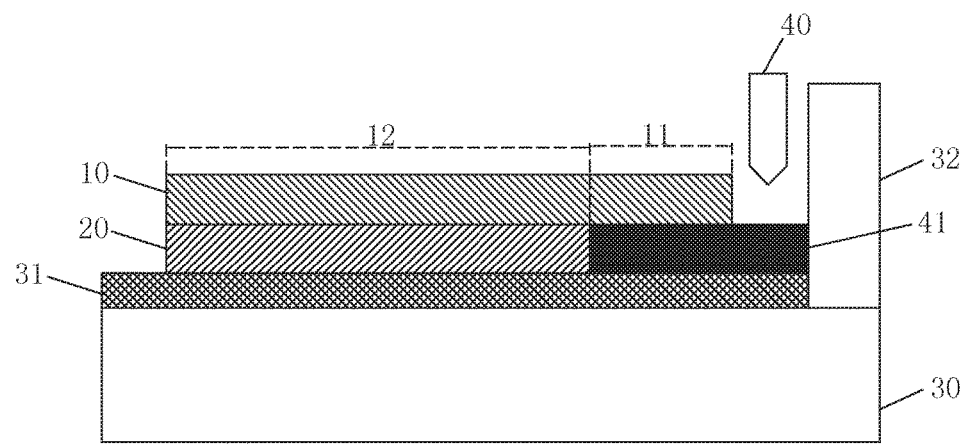
FIG. 7 is a schematic view illustrating Step S4 of the method for sealing a peripheral frame of a display screen according to the present invention.
Figure 8:
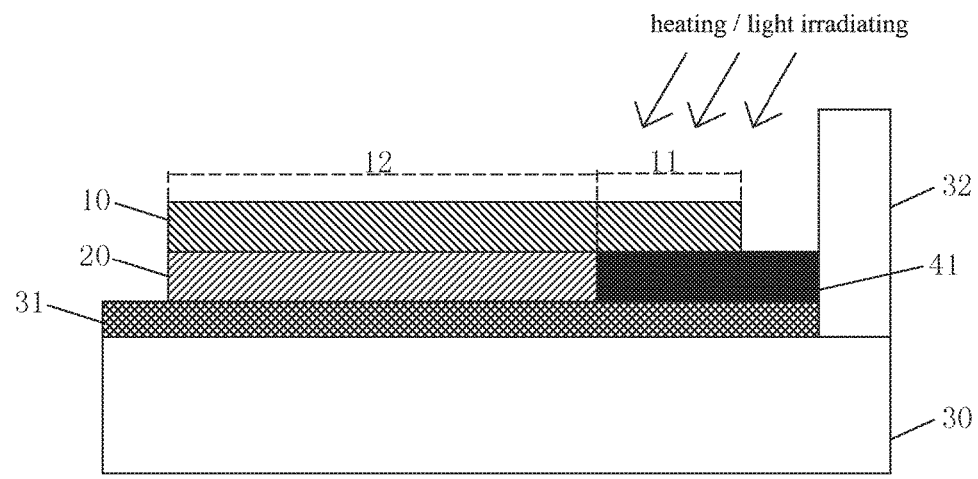
FIG. 8 is a schematic view illustrating Step S5 of the method for sealing a peripheral frame of a display screen according to the present invention.
Figure 9:
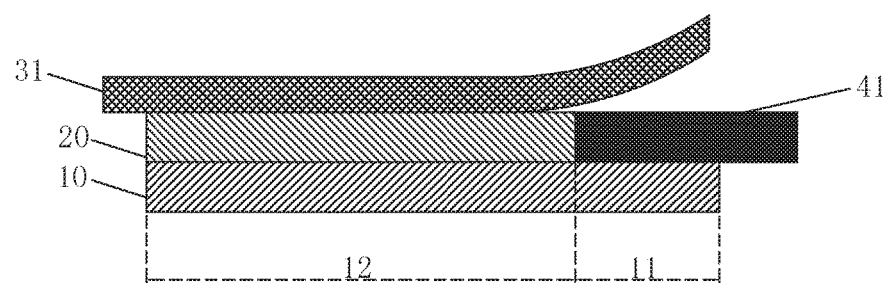
FIG. 9 is a schematic view illustrating Step S6 of the method for sealing a peripheral frame of a display screen according to the present invention.
Figure 10:
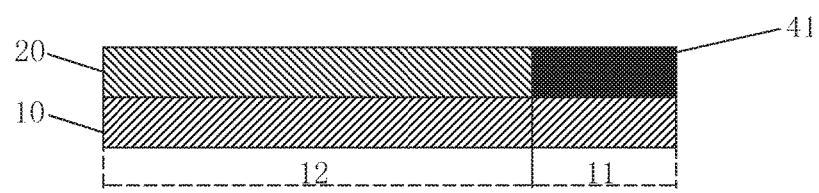
FIG. 10 is a schematic view illustrating Step S7 of the method for sealing a peripheral frame of a display screen according to the present invention.

Referring to FIG. 3, the present invention provides a method for sealing a peripheral frame of a display screen, which comprises the following steps:

Step S1: referring to FIG. 4, providing a display screen 1, wherein the display screen 1 comprises: a first substrate 10 and a second substrate 20 arranged on the first substrate 10, and the first substrate 10 comprises a panel zone 12 covered by the second substrate 20 and a peripheral frame 11 located outside the panel zone 12.

Specifically, the first substrate 10 is a thin-film transistor (TFT) substrate, and the second substrate 20 is a color filter substrate.

Specifically, Step S1 further comprises a step of cleaning a surface of the peripheral frame 11 to ensure quality of sealing conducted on the peripheral frame 11 in subsequent operations.

Step S2: providing a substrate suction-holding platform 30, wherein the substrate suction-holding platform 30 has an upper surface on which a positioning plate 32 is provided; and a separation and protection film 31 is attached to the upper surface of the substrate suction-holding platform 30.

Preferably, the positioning plate 32 is arranged on an edge of the upper surface of the substrate suction-holding platform 30.

Specifically, the separation and protection film 31 is attached, in Step S2, such that substantially no spacing gap is present between the separation and protection film 31 and the positioning plate 32.

It is noted here that the separation and protection film 31 provides an effect of preventing sealant 41 that is injected subsequently from adhesively attaching to the substrate suction-holding platform 30 and allowing for easy separation of the display screen 1 from the substrate suction-holding platform 30.

Step S3: suction-attaching the display screen 1 to the substrate suction-holding platform 30 such that one side of the second substrate 20 that is distant from the first substrate 10 is attached to the separation and protection film 31 and an edge of the first substrate 10 is spaced from the positioning plate 32 by a predetermined gap.

Specifically, the predetermined gap is determined according to minimum spacing for injection available for a sealant injection device 40 that will be used subsequently. Preferably, the predetermined gap is between 0.5 mm-10 mm.

Step S4: using a sealant injection device 40 to inject sealant 41 along and into the gap between the edge of the first substrate 10 and the positioning plate 32.

It is noted here that Step S4 adopts a penetration based filling process to make the sealant 41 uniformly filled between the peripheral frame 11 and the separation and protection film 31, and upon completion of Step S4, the sealant 41 exhibits a thickness that is the spacing distance between the peripheral frame 11 and the separation and protection film 31. In other words, the thickness of the sealant 41 is generally corresponding to a thickness of the second substrate 20. Compared to the conventional way of front side application based sealing operation for a peripheral frame, this invention may greatly improve uniformity of the sealant 41 and allows for precise control of the thickness of the sealant 41, and requires just a low level of accuracy for the sealant injection device 40, making it possible to greatly reduce manufacturing costs.

Specifically, the sealant 41 has a color that is selected as a non-light-transmitting color, preferably black or brown.

Specifically, the sealant 41 can be any type of sealant 41, preferably heat curable sealant or light curable sealant.

Specifically, the separation and protection film 31 and the sealant 41 do not adhere to each other to prevent the separation and protection film 31 from affecting the adhesion property of the sealant 41.

Specifically, Step S4 further comprises, after the injection of the sealant 41, a sub-step of keeping the display screen 1 still for a predetermined period of time to allow the sealant 41 to completely filled between the peripheral frame 11 and the separation and protection film 31. The predetermined period of time is determined according to the specific type of the sealant 41 used to suit the need of allowing the sealant 41 to completely fill up the space between the peripheral frame 11 and the separation and protection film 31 within the predetermined period of time.

Step S5: subjecting the sealant 41 to curing.

Specifically, Step S5 in conducted such that a curing process is selected according to the type of the sealant 41 used. For example, when the sealant 41 is a heat curable sealant, Step S5 applies heating to proceed with curing of the sealant 41; and when the sealant 41 is a light curable sealant, Step S5 applies light irradiating to proceed with curing of the sealant 41.

Step S6: terminating suction-attachment of the display screen 1 to the substrate suction-holding platform 30 and removing the display screen 1 from the substrate suction-holding platform 30 to remove the separation and protection film 31 from the surface of the second substrate 20.

Specifically, Step S6 is conducted by first peeling the display screen 1 together with the separation and protection film 31 from the substrate suction-holding platform 30 and then peeling the separation and protection film 31 from the surface of the second substrate 20 to complete the operation of separating the display screen 1 from the substrate suction-holding platform 30 and removing the separation and protection film 31 from the surface of the second substrate 20.

Step S7: cutting the sealant 41 in a straight linear manner alongside the edge of the first substrate 10.

Specifically, since Step S7 is conducted such that the sealant 41 is cut and trimmed along a straight line alongside the edge of the first substrate 10, the sealant 41 so cut and trimmed exhibits a width that corresponds to a width of the peripheral frame 11 and the sealant 41 also shows a thickness that corresponds to a thickness of the second substrate 20. Compared to the conventional way of light-shielding adhesive tape based sealing operation for a peripheral frame, this invention helps overcome the issue of un-matching of the size and thickness of the sealant 41 with the peripheral frame 11.

In summary, the prevent invention provides a method for sealing a peripheral frame of a display screen, which comprises providing a display screen that comprises a first substrate and a second substrate and the first substrate comprises a panel zone covered by the second substrate and a peripheral frame located outside the panel zone and making the display screen suction-attached to a substrate suction-holding platform to have one side of the second substrate that is distant from the first substrate attached to a separation and protection film provided on the substrate suction-holding platform with an edge of the first substrate set at predetermined spacing from a positioning plate provided on the substrate suction-holding platform so that a sealant injection device is operable to inject sealant along and into a gap between the edge of the first substrate and the positioning plate to achieve coating uniformity of sealant on the peripheral frame and precise control of thickness of sealant, and only a low level of accuracy of the sealant injection device is required to thereby greatly reduce manufacturing costs.

Based on the description given above, those having ordinary skills in the art may easily contemplate various changes and modifications of he technical solution and the technical ideas of the present invention. All these changes and modifications are considered belonging to the protection scope of the present invention as defined in the appended claims.

What is claimed is:

1. A method for sealing a peripheral frame of a display screen, comprising the following steps:
   Step S1: providing a display screen, wherein the display screen comprises: a first substrate and a second substrate arranged on the first substrate, and the first substrate comprises a panel zone covered by the second substrate and a peripheral frame located outside the panel zone;
   Step S2: providing a substrate suction-holding platform, wherein the substrate suction-holding platform has an upper surface on which a positioning plate is provided; and a separation and protection film is attached to the upper surface of the substrate suction-holding platform;
   Step S3: suction-attaching the display screen to the substrate suction-holding platform such that one side of the second substrate that is distant from the first substrate is attached to the separation and protection film and an edge of the first substrate is spaced from the positioning plate by a predetermined gap;
   Step S4: using a sealant injection device to inject sealant along and into the gap between the edge of the first substrate and the positioning plate;
   Step S5: subjecting the sealant to curing;

Step S6: terminating suction-attachment of the display screen to the substrate suction-holding platform and removing the display screen from the substrate suction-holding platform to remove the separation and protection film from the surface of the second substrate; and Step S7: cutting the sealant in a straight linear manner alongside the edge of the first substrate.

2. The method for sealing a peripheral frame of a display screen as claimed in claim 1, wherein Step S1 further comprises a sub-step of cleaning a surface of the peripheral frame.

3. The method for sealing a peripheral frame of a display screen as claimed in claim 1, wherein the positioning plate is arranged on an edge of the upper surface of the substrate suction-holding platform.

4. The method for sealing a peripheral frame of a display screen as claimed in claim 1, wherein the first substrate comprises a thin-film transistor (TFT) substrate and the second substrate comprises a color filter substrate.

5. The method for sealing a peripheral frame of a display screen as claimed in claim 1, wherein in Step S2, the separation and protection film is attached such that no gap is present between the separation and protection film and the positioning plate.

6. The method for sealing a peripheral frame of a display screen as claimed in claim 1, wherein the predetermined gap is between 0.5 mm-10 mm.

7. The method for sealing a peripheral frame of a display screen as claimed in claim 1, wherein the sealant has a color of black or brown.

8. The method for sealing a peripheral frame of a display screen as claimed in claim 1, wherein the sealant comprises a heat curable sealant, and curing of the sealant is conducted through heating in Step S5.

9. The method for sealing a peripheral frame of a display screen as claimed in claim 1, wherein the sealant comprises a light curable sealant, and curing of the sealant in conducted through irradiating light in Step S5.

10. The method for sealing a peripheral frame of a display screen as claimed in claim 1, wherein Step S4 further comprises a sub-step of keeping the display screen still for a predetermined period of time after the injection of the sealant.

11. A method for sealing a peripheral frame of a display screen, comprising the following steps:

Step S1: providing a display screen, wherein the display screen comprises: a first substrate and a second substrate arranged on the first substrate, and the first substrate comprises a panel zone covered by the second substrate and a peripheral frame located outside the panel zone;

Step S2: providing a substrate suction-holding platform, wherein the substrate suction-holding platform has an upper surface on which a positioning plate is provided; and a separation and protection film is attached to the upper surface of the substrate suction-holding platform;

Step S3: suction-attaching the display screen to the substrate suction-holding platform such that one side of the second substrate that is distant from the first substrate is attached to the separation and protection film and an edge of the first substrate is spaced from the positioning plate by a predetermined gap;

Step S4: using a sealant injection device to inject sealant along and into the gap between the edge of the first substrate and the positioning plate;

Step S5: subjecting the sealant to curing;

Step S6: terminating suction-attachment of the display screen to the substrate suction-holding platform and removing the display screen from the substrate suction-holding platform to remove the separation and protection film from the surface of the second substrate; and Step S7: cutting the sealant in a straight linear manner alongside the edge of the first substrate;

wherein Step S1 further comprises a sub-step of cleaning a surface of the peripheral frame; and wherein the positioning plate is arranged on an edge of the upper surface of the substrate suction-holding platform.

12. The method for sealing a peripheral frame of a display screen as claimed in claim 11, wherein the first substrate comprises a thin-film transistor (TFT) substrate and the second substrate comprises a color filter substrate.

13. The method for sealing a peripheral frame of a display screen as claimed in claim 11, wherein in Step S2, the separation and protection film is attached such that no gap is present between the separation and protection film and the positioning plate.

14. The method for sealing a peripheral frame of a display screen as claimed in claim 11, wherein the predetermined gap is between 0.5 mm-10 mm.

15. The method for sealing a peripheral frame of a display screen as claimed in claim 11, wherein the sealant has a color of black or brown.

16. The method for sealing a peripheral frame of a display screen as claimed in claim 11, wherein the sealant comprises a heat curable sealant, and curing of the sealant is conducted through heating in Step S5.

17. The method for sealing a peripheral frame of a display screen as claimed in claim 11, wherein the sealant comprises a light curable sealant, and curing of the sealant in conducted through irradiating light in Step S5.

18. The method for sealing a peripheral frame of a display screen as claimed in claim 11, wherein Step S4 further comprises a sub-step of keeping the display screen still for a predetermined period of time after the injection of the sealant.

* * * * *